INVENTOR
ERNEST W. MILLER
ATTORNEY

United States Patent Office 3,371,694
Patented Mar. 5, 1968

3,371,694
COMBINATION SCOOP AND CUTTING BOARD
Ernest W. Miller, 420 Patch Ave.,
San Jose, Calif. 95128
Filed Apr. 9, 1965, Ser. No. 446,928
3 Claims. (Cl. 146—215)

ABSTRACT OF THE DISCLOSURE

A combination scoop and cutting board in which a cutting board is integrally connected on one side to an open ended scoop having vertical side walls and on the other side to a handle.

---

According to the teachings of the present invention there is disclosed a handy, compact kitchen utensil so constructed that various articles of food such as meat, cheese, vegetables and the like may readily be cut or chopped on a first portion to a desired degree and then received within a second portion of the utensil for ultimate transfer to another receptacle such as a dish, bowl, pot and the like. In particular, there is disclosed a scoop having a scoop head, an open-ended scoop blade secured at one end to the scoop head and a handle projecting from the scoop head, in which the scoop head is provided with a flat upper surface of sufficient area that articles of food may be cut thereon.

It is the principle object of the present invention, therefore, to provide a combination scoop and cutting board.

The features of novelty that are considered characteristic of this invention are set forth with particularity in the appended claims. The organization and method of operation of the invention itself will best be understood from the following description when read in connection with the accompanying drawing in which:

Figure 1:
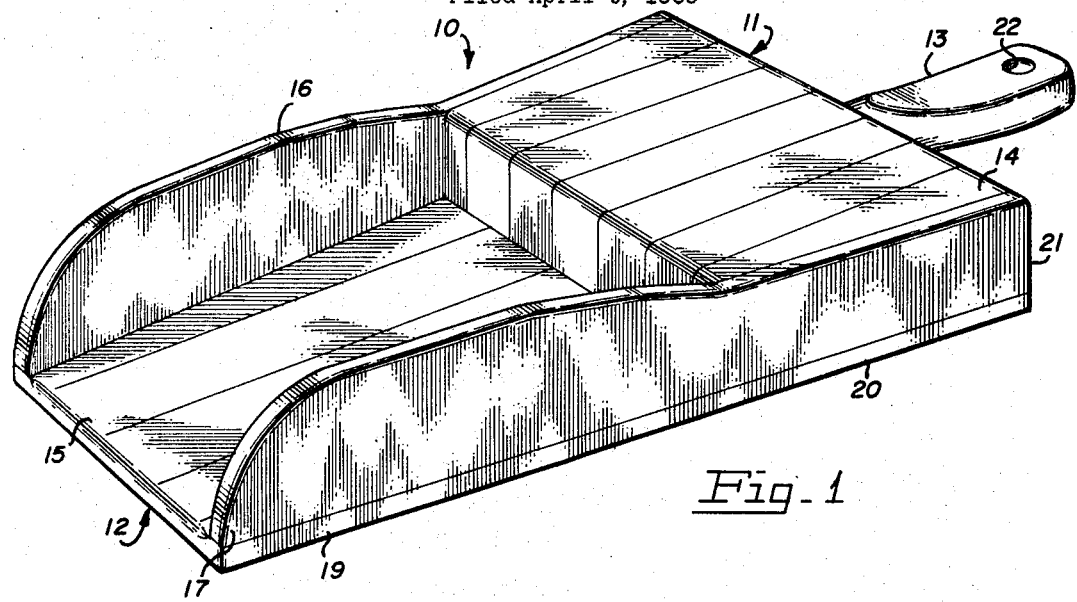
FIGURE 1 is a perspective view of a combination scoop and cutting board of the present invention.
Figure 2:
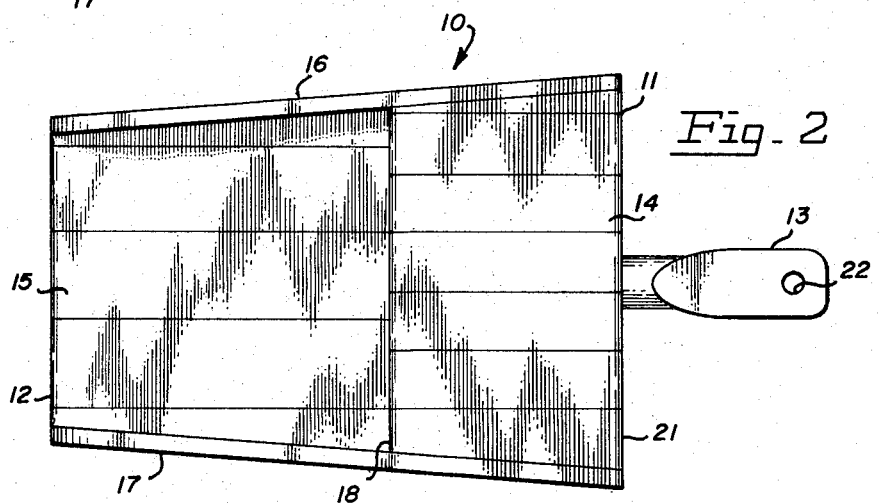
FIGURE 2 is a reduced top view of the combination scoop and cutting board of FIGURE 1.
Figure 3:
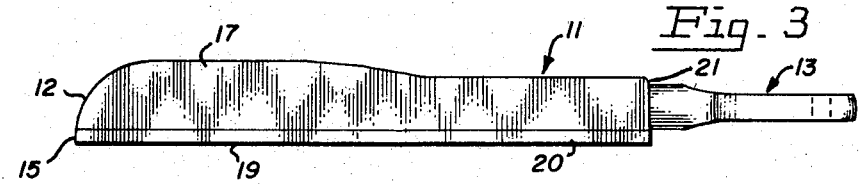
FIGURE 3 is a reduced side view of the combination scoop and cutting board of FIGURE 1.

Referring now to the drawing, there is disclosed the novel combination scoop and cutting board 10 of the present invention comprising a scoop head 11, an open-ended scoop blade 12 secured at one end to the scoop head 11, and a handle 13 projecting from the scoop head 11.

The scoop head 11 is provided with a generally flat upper surface 14 raised with respect to the bottom wall 15 of the scoop blade 13, and of sufficient length and width that it will be apparent that it is designed as a board for cutting articles of food thereon conveniently using a standard kitchen knife.

The scoop blade 12 includes the flat bottom wall 15 and a pair of sidewalls 16 and 17 extending upwardly therefrom, all formed integrally to one side 18 of the scoop head 11. Preferably, the lower surface 19 of the bottom wall 15 lies in the same plane as the lower surface 20 of the scoop head 11. This arrangement provides an added measure of stability during cutting.

The handle 13 projects from the side 21 of the scoop head 11 opposite to the scoop blade 12 and is provided with an aperture 22 to permit hanging when not in use. The utensil is illustrated as an integral piece and may be formed of wood preferably, or a synthetic plastic composition and the like.

In use a food product is placed on the cutting board surface 14 where it is cut to the desired degree of fineness. The chopped up food is then transferred to the scoop blade 12, which, being open-ended, permits convenient transfer to a dish, bowl and the like.

While the above detailed description has shown, described and pointed out the fundamental novel features of the invention as applied to various embodiments, it will be understood that various omissions and substitutions and changes in the form and detail of the device illustrated may be made by those skilled in the art, without departing from the spirit of the invention. It is the intention, therefore, to be limited only as indicated by the scope of the following claims.

What is claimed is:

1. A combination scoop and cutting board utensil comprising, an open-ended flat scoop blade, a scoop head having a surface area lying in a plane substantially parallel to said blade and secured to one end thereof provided with a flat, upper surface forming a cutting board, and a handle projecting from said cutting board in the opposite direction from said scoop blade.

2. The utensil according to claim 1, wherein said scoop blade includes a bottom wall and a pair of spaced sidewalls extending upwardly therefrom.

3. A combination scoop and cutting board utensil comprising, a scoop blade having a substantially flat, upper surface, a pair of opposite sidewalls extending upwardly from the flat, upper surface of said scoop blade, a scoop head secured to one end of said scoop blade and having a flat, upper surface forming a cutting board the wall of the scoop head to which said scoop blade is secured forming the third sidewall for said scoop blade, and a scoop handle projecting from said scoop head in a direction opposite from said scoop blade, so that the three-walled scoop blade forms an open-ended scoop.

References Cited

UNITED STATES PATENTS

| D. 157,123 | 2/1950 | Boeye. | |
|---|---|---|---|
| D. 200,970 | 4/1965 | Miller | 294—55 X |
| 1,315,101 | 9/1919 | Ehrke | 146—215 |
| 2,563,223 | 8/1951 | Dreher | 294—55 |

W. GRAYDON ABERCROMBIE, *Primary Examiner.*